United States Patent
Tsai et al.

(10) Patent No.: US 9,317,092 B2
(45) Date of Patent: Apr. 19, 2016

(54) UNIVERSAL SERIAL BUS CHARGERS AND CHARGING MANAGEMENT METHODS

(71) Applicant: Acer Incorporated, New Taipei (TW)

(72) Inventors: Meng-Chieh Tsai, New Taipei (TW); Che-Wei Lin, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 194 days.

(21) Appl. No.: 14/150,217

(22) Filed: Jan. 8, 2014

(65) Prior Publication Data

US 2014/0298046 A1    Oct. 2, 2014

(30) Foreign Application Priority Data

Mar. 29, 2013  (TW) .............................. 102111367 A

(51) Int. Cl.
*H02J 7/00* (2006.01)
*G06F 1/26* (2006.01)
(52) U.S. Cl.
CPC ............... *G06F 1/266* (2013.01); *H02J 7/0077* (2013.01); *H02J 2007/0098* (2013.01)
(58) Field of Classification Search
USPC ........................................................ 320/128
See application file for complete search history.

(56) References Cited

U.S. PATENT DOCUMENTS

| 7,615,965 | B2 * | 11/2009 | Popescu-Stanesti et al. . | 320/128 |
| 8,106,630 | B2 * | 1/2012 | Tupman et al. ............... | 320/132 |
| 8,344,702 | B2 * | 1/2013 | Sun et al. ...................... | 320/163 |
| 8,358,107 | B2 | 1/2013 | Nguyen | |
| 8,862,916 | B2 | 10/2014 | Lee et al. | |
| 2004/0164707 | A1 * | 8/2004 | Veselic et al. ................. | 320/128 |
| 2006/0033474 | A1 * | 2/2006 | Shum ............................ | 320/128 |
| 2007/0075683 | A1 * | 4/2007 | Chung et al. .................. | 320/128 |

(Continued)

FOREIGN PATENT DOCUMENTS

| TW | I253226 | 4/2006 |
| TW | 200713739 | 4/2007 |

(Continued)

OTHER PUBLICATIONS

European Search Report dated Mar. 23, 2015, issued in application No. 14152047.8.

(Continued)

*Primary Examiner* — Samuel Berhanu
(74) *Attorney, Agent, or Firm* — McClure, Qualey & Rodack, LLP

(57) ABSTRACT

Universal serial bus chargers and charging management methods thereof are provided. The universal serial bus charger includes a control unit, a charger module, a universal serial bus interface device, and a switch device. The control unit receives a power management signal and provides a switching signal and a charging signal according to the power management signal. The charger module outputs power and a power suspending signal according to the charging signal and a communications protocol signal, respectively. The universal serial bus interface device operates according to the power, and outputs the communications protocol signal according to a universal serial bus peripheral device connected thereto. The switch device is coupled between the charger module and the universal serial bus interface device, and receives the power. Furthermore, the switch device provides the power to the universal serial bus interface device according to the switching signal.

9 Claims, 3 Drawing Sheets

(56) References Cited

U.S. PATENT DOCUMENTS

| | | |
|---|---|---|
| 2007/0103115 A1 | 5/2007 | Liu |
| 2008/0313477 A1 | 12/2008 | Numano |
| 2011/0016341 A1 | 1/2011 | Tom et al. |
| 2011/0285343 A1 | 11/2011 | Weng |

FOREIGN PATENT DOCUMENTS

| | | |
|---|---|---|
| TW | 201143253 | 12/2011 |
| TW | 201249049 | 12/2012 |

OTHER PUBLICATIONS

Taiwanese language office action dated Dec. 15, 2014.
English language translation of abstract of TW I253226 (published Apr. 11, 2006).
English language translation of abstract of TW 200713739 (published Apr. 1, 2007).
English language translation of abstract of TW 201143253 (published Dec. 1, 2011).
English language translation of abstract of TW 201249049 (published Dec. 1, 2012).

* cited by examiner

UNIVERSAL SERIAL BUS CHARGERS AND CHARGING MANAGEMENT METHODS

CROSS REFERENCE TO RELATED APPLICATIONS

This Application claims priority of Taiwan Patent Application No. 102111367, filed on Mar. 29, 2013, the entirety of which is incorporated by reference herein.

BACKGROUND OF THE INVENTION

1. Field of the Invention

The application relates in general to a universal serial bus charger, and in particular, to the enabling of a charge operation of a universal serial bus charger according to a global system state of a computer.

2. Description of the Related Art

The universal serial bus interface is widely used in a plurality of electronic devices, like mobile phones, tablet personal computers, cameras, and so on. These electronic devices are designed to be charged when connected to a universal serial bus charger of a computer. According to the universal serial bus charger protocol, the universal serial bus charger can provide 100 mA to 500 mA for charging. However, charging from the universal serial bus interface might consume power from the computer. Therefore, the management of power consumption by a computer must be more efficient.

BRIEF SUMMARY OF INVENTION

An embodiment of the invention provides a universal serial bus charger, comprising a control unit, a charger module, a universal serial bus interface device, and a switch device. The control unit receives a power management signal and provides a switching signal and a charging signal according to the power management signal. The charger module outputs power and a power suspending signal according to the charging signal and a communications protocol signal, respectively. The universal serial bus interface device operates according to the power, and outputs the communications protocol signal according to a universal serial bus peripheral device connected thereto. The switch device is coupled between the charger module and the universal serial bus interface device, and receives the power. Furthermore, the switch device provides the power to the universal serial bus interface device according to the switching signal.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Figure 1:
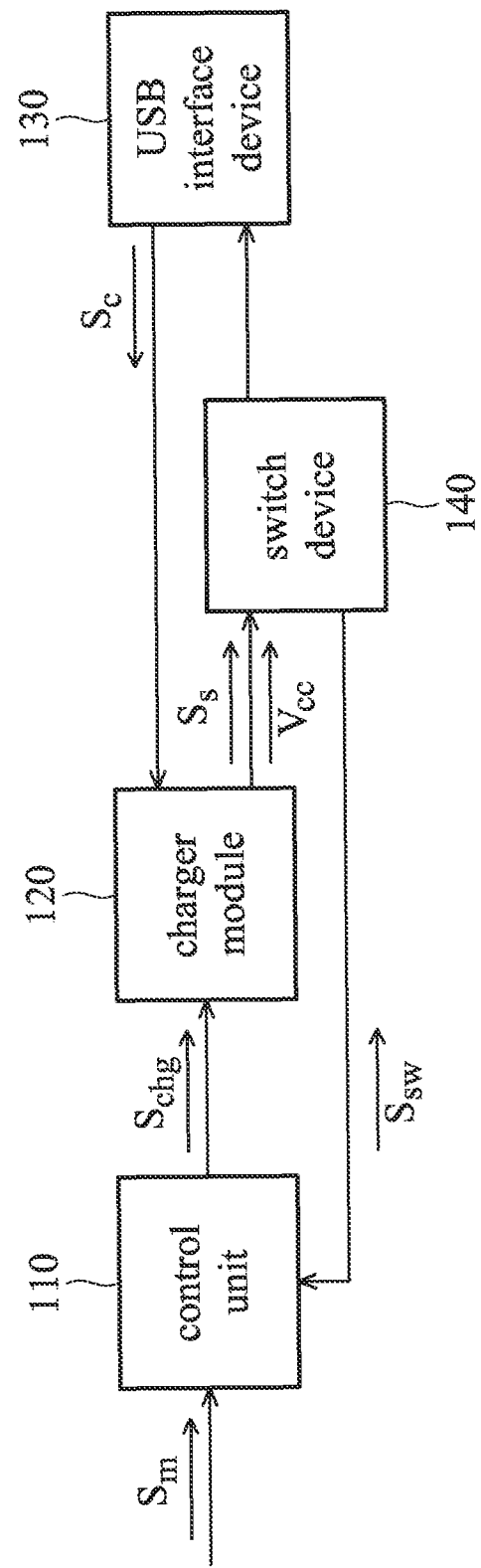
FIG. 1 is a block diagram of a universal serial bus charger in accordance with an embodiment of the invention.

FIG. 1 is a block diagram of the universal serial bus (USB) charger in accordance with an embodiment of the invention. The USB charger 100 includes a control unit 110, a charger module 120, a USB interface device 130, and a switch device 140. The control unit 110 receives a power management signal Sm, and provides a switching signal Ssw and a charging signal Schg according to the power management signal Sm to the switch device 140 and the charger module 120, respectively. In accordance with an embodiment of the invention, the power management signal Sm is generated by a central processing unit (CPU) (not shown) according to the global system state of a computer. According to the ACPI (Advanced Configuration and Power Interface) specification formulated by Intel, Microsoft, Phoenix, HP, and Toshiba, an ACPI-compliant computer-system can be defined to be in four Global "Gx" states and six Sleep "Sx" states. In the "G0" state, or "S0" state, a monitor is off but back ground tasks are running. In the "G1" state, the CPU is in a sleep state, which can be subdivided into four states "S1" through "S4". In the "S1" state, power to the CPU and RAM is maintained and devices that do not indicate that they must remain on are powered down. In the "S2" state, the CPU is powered off and dirty cache is flushed to the RAM. In the "S3" state, or "Standby" state, "Sleep" state, or "Suspend to RAM" state, the RAM remains powered. In the "S4" state, or "Suspend to Disk" state, all content of the main memory is saved to a non-volatile memory, such as a hard drive, to protect the state of the system, and the system is powered down. In the "G2" state, or "S5" state, or "Soft Off" state, the power supply supplies power, at a minimum, to the power button to allow a return to the "S0" state. In accordance with an embodiment of the invention, when the global system state of the computer operating in the "S3" state, "S4" state, or "S5" state, the control unit 110 outputs the switch signal Ssw to the switch device 140.

The charger module 120 outputs power Vcc and a power suspending signal Ss according to the charging signal Schg and a communications protocol signal Sc, respectively. The charger module 120 determines whether to charge the USB peripheral device or not according to a USB charger protocol when receiving the communications protocol signal Sc, and outputs the power suspending signal Ss when the communications protocol signal Sc does not conform to the USB charger protocol. The switch device 140 is coupled between the charger module 120 and the USB interface device 130, and receives the power Vcc. Further, the switch device 140 provides the power Vcc to the USB interface device 130 according to the switch signal Ssw and the power suspending signal Ss. When the control unit 110 outputs the switching signal Ssw according to the power management signal Sm, then the charger module 120 stops providing the power Vcc to the USB interface device 130 for a predetermined time (e.g. it can be set between 0.5 second to 2 second by the user). Afterward, the switch device 140 provides the power Vcc to the USB interface device 130 once again. Here, the temporary suspension of power to the USB interface device 130 simulates the plug in and out operations of the USB peripheral device 130, such that the charger module 120 may re-conform the type of the USB peripheral device 130. The switch device 140 stops providing the power Vcc to the USB interface device 130 when receiving the power suspending signal Ss output from the charger module 120 according to the communications protocol signal Sc. The USB interface device 130 operates according to the power Vcc, and outputs the communications protocol signal Sc according to the USB peripheral device connected thereto.

Figure 2:
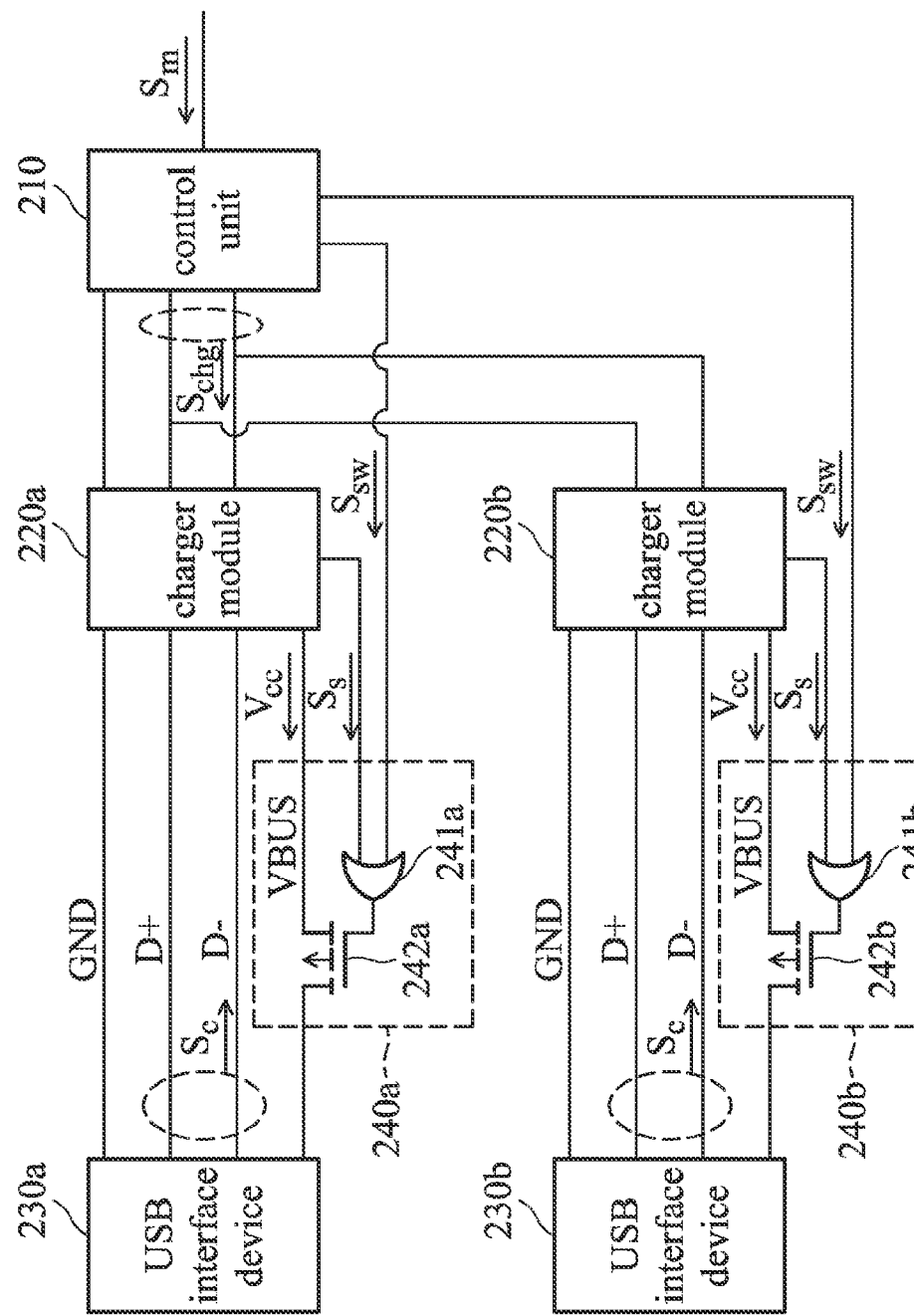
FIG. 2 is a circuit diagram of a universal serial bus charger in accordance with an embodiment of the invention.

FIG. 2 is a circuit diagram of a USB charger in accordance with an embodiment of the invention. Referring to FIG. 2, the USB charger includes a control unit 210, the charger modules 220a and 220b, the USB interface devices 230a and 230b, and the switching devices 240a and 240b. As shown in FIG. 2, the control unit 210 controls two of the charger modules 220a and 220b, but in practice, the number of charger module varies with system requirements. The control unit 210 receives the power management signal Sm, and outputs the switching signal Ssw and a charging signal Schg according to the power management signal Sm. The power management signal Sm is generated by a CPU (not shown) according to the global system state of a computer. When the global system state of the computer operating in a predetermined state setting by the user, the control unit 210 outputs the switching signal Ssw to the switch device 240a. In accordance with the embodiment, the control unit 210 provides the switching signal Ssw to the switch device 240a when the computer is operating in a "Standby" state, "Sleep" state or "Soft off" state.

The charger module 220a outputs the power Vcc and the power suspending signal Ss according to the charging signal Schg and the communications protocol signal Sc, respectively. The charger module 220a determines whether to charge the USB peripheral device or not according to the USB charger protocol, and outputs the power suspending signal Ss to the switch device 240a when receiving the communications protocol signal Sc.

The switch device 240a is coupled between the charger module 220a and the USB interface device 230a and receives the power Vcc. The switch device 240a provides the power Vcc to the USB interface device 230a according to the switch signal Ssw. The switch device 240a stops providing the power Vcc to the USB interface device 230a for a predetermined time (e.g. it can be set between 0.5 second to 2 second by the user) when receiving the switching signal Ss, and afterward, restarts providing the power Vcc once again. When the switch device 240a receives the power suspending signal Ss outputted by the charger module 220a, the switch device 240a stops providing the power Vcc to the USB interface device 230a. The switch device 240a further comprises a logic gate 241a and a transistor 242a. The logic gate 241a coupled to a first input end of the charger module 220a and a second input end and an output end of the control unit 210. A first end of the transistor 242a is coupled to the charger module 220a, a second end of the transistor 242a is coupled to the USB interface device 230a, and a control end of the transistor 242a is coupled to the output end of the logic gate 241a. In accordance with the embodiment, the logic gate 241a can be an OR-gate. The charger module 220a provides a high logic level signal to the first input end of the OR-gate when outputting the power suspending signal Ss. The control unit 210 also provides a high logic level signal to the second input end of the OR-gate when outputting the switching signal Ssw. Finally, the logic gate 241a is output at a high logic level according to the logic operation of the OR-gate when receiving one of the power suspending signal Ss or the switching signal Ssw. In addition, the transistor 242a can be a p-type metal-oxide-semiconductor field-effect transistor (MOSFET). The p-type MOSFET stops providing the power Vcc to the USB interface device 230a when the output end of the logic gate 241a is output at the high logic level. The p-type MOSFET provides the power Vcc to the USB interface device 230a once again when the output end of the logic gate 241a is output at a low logic level.

The USB interface device operates according to the power Vcc, and outputs the communications protocol signal Sc according to the USB peripheral device connected thereto. As shown in FIG. 2, the communications protocol signal Sc is translated via a pair of wires which are labeled as D+ and D−.

In addition, as shown in FIG. 2, the switch device 240b further comprises a logic gate 241b and a transistor 242b, wherein the operations of the logic gate 241b and the transistor 242b are similar to those described before, and hence is not discussed in further detail herein.

Figure 3:
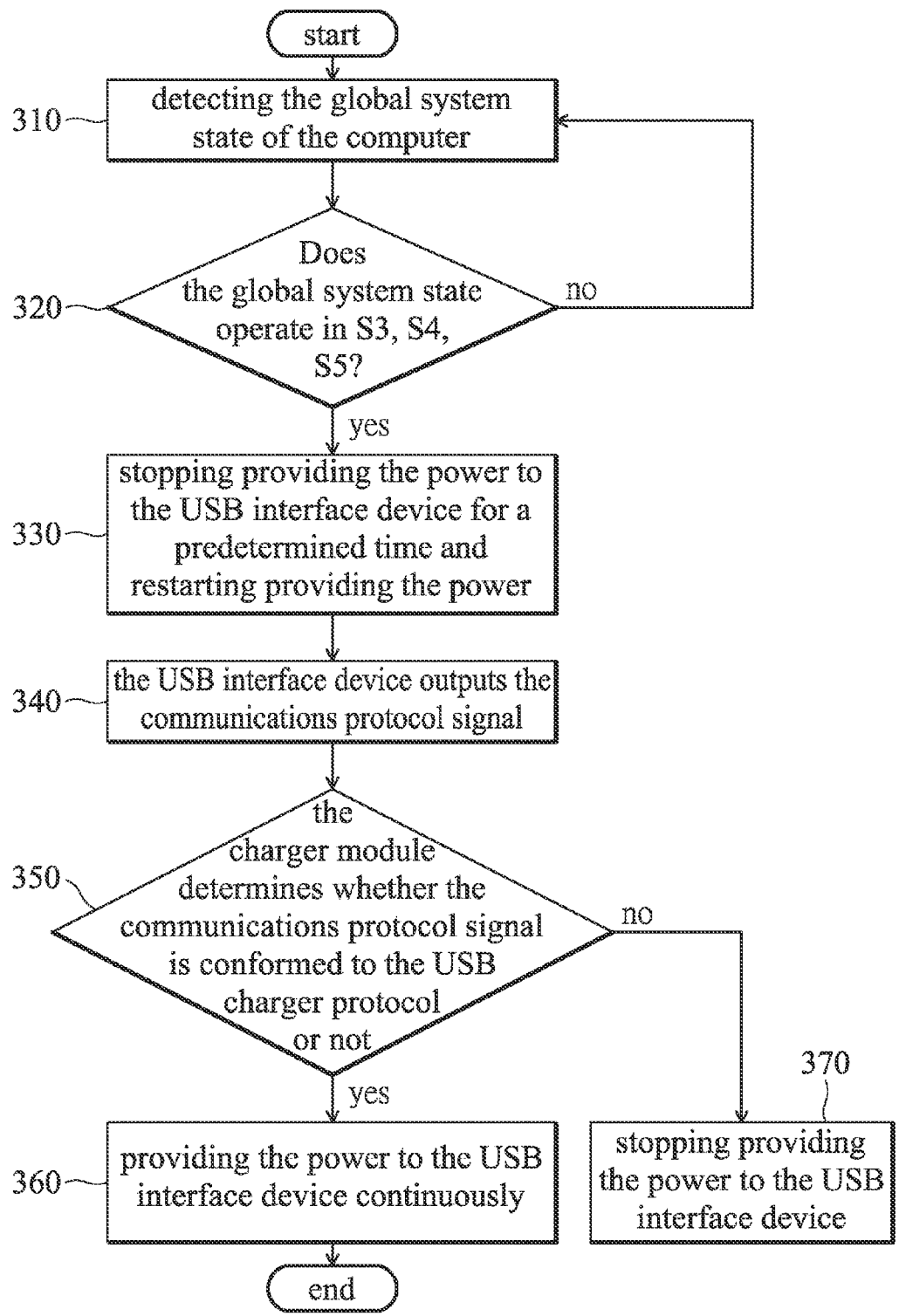
FIG. 3 is a flow chart of the management method of a universal serial bus charger in accordance with an embodiment of the invention.

FIG. 3 is a flow chart of the management method of the USB charger in accordance with an embodiment of the invention. The sequence of the flow chart has been described by way of example and in terms of a preferred embodiment, but, it is to be understood that it is not limited thereto.

Referring to FIG. 1 and FIG. 3, at step 310, the power management signal S1 is generated by a CPU according to a global system state of a computer, and outputs the power management signal S1 to the control unit 110. At step 320, the control unit 110 outputs a switching signal Ssw to the switch device 140 when the global system state of the computer operating in a "Standby" state, "Sleep" state or "Soft Off" state, otherwise, step 310 is performed. At step 330, the switch device 140 stops providing the power Vcc to the USB interface device 130 for a predetermined time when the switch device 140 receives the switching signal Ssw, and then provides the power Vcc to the USB interface device 130 once again. At step 340, the USB interface device 130 operates according to the power Vcc, and outputs the communications protocol signal Sc according to the USB peripheral device connected thereto. At step 350, the charger module 120 determines whether to charge the USB peripheral device or not according to the USB charger protocol when receiving the communications protocol signal Sc. The charger module 120 provides the power Vcc to the USB interface device 130 continuously when the communications protocol signal Sc conforms to the USB charger protocol, that is, the USB peripheral device is a chargeable device. Otherwise, the switch device 140 stops providing the power Vcc to the USB interface device 130 according to the power suspending signal Ss output from the charger module 120.

When the global system state of the computer is operating in a "Standby" state, "Sleep" state, or "Soft Off" state, it will provide the power to the USB charger continuously. However, the operation of some electronic devices using the USB interface device, like a USB Flash Drive and Portable Hard Disk Device, need no power. For that reason, the present application provides a USB charger and a management method for managing the power of a computer efficiently.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A universal serial bus charger, comprising:
a control unit, receiving a power management signal, and outputting a switching signal and a charging signal according to the power management signal;
a charger module, outputting power and a power suspending signal according to the charging signal and a communications protocol signal, respectively;
a universal serial bus interface device, operating according to the power, and outputting the communications protocol signal according to a universal serial bus peripheral device connected thereto; and
a switch device, coupled between the charger module and the universal serial bus interface device, receiving the power and providing the power to the universal serial bus interface device according to the switch signal and the power suspending signal;

wherein the switch device further comprises a logic gate and a transistor, the logic gate has a first input end coupled to the charger module, a second input end coupled to the control unit, and an output end, and the transistor has a first end coupled to the charger module, a second end coupled to the universal serial bus interface device, and a control end coupled to the output end of the logic gate.

2. The universal serial bus charger as claimed in claim 1, wherein the power management signal is generated by a central processing unit according to a global system state of a computer, and the control unit outputs the switching signal to the switch device when the computer is operating in a "Standby" state, "Sleep" state or "Soft off" state.

3. The universal serial bus charger as claimed in claim 1, wherein the charger module determines whether to charge the universal serial bus peripheral device or not according to a universal serial bus charger protocol after receiving the communications protocol signal, and outputs the power suspending signal when the communications protocol signal does not conform to the universal serial bus charger protocol.

4. The universal serial bus charger as claimed in claim 1, wherein the switch device stops providing the power to the universal serial bus interface device when receiving one of the switching signal or the power suspending signal.

5. The universal serial bus charger as claimed in claim 1, wherein the switch device stops providing the power to the universal serial bus interface device for a predetermined time after receiving the switching signal, and then restarts providing the power to the universal serial bus interface device thereafter.

6. The universal serial bus charger as claimed in claim 1, wherein when the logic gate is an OR-gate:
   the charger module provides a high logic level signal to the first input end of the OR-gate when outputting the power suspending signal;
   the control unit provides the high logic level signal to the second input end of the OR-gate when outputting the switching signal; and
   the OR-gate is output at a high logic level according to a logic operation of the OR-gate when receiving one of the power suspending signal or the switching signal; and
   when the transistor is a p-type metal-oxide-semiconductor field-effect transistor:
   the p-type metal-oxide-semiconductor field-effect transistor stops providing the power to the universal serial bus interface device when the output end of the logic gate is output at the high logic level; or
   the p-type metal-oxide-semiconductor field-effect transistor restarts providing the power to the universal serial bus interface device when the output end of the logic gate is output at a low logic level.

7. A charging management method for a universal serial bus charger, comprising:
   generating a switching signal and a charging signal via a control unit according to a power management signal;
   generating power and a power suspending signal via a charger module according to the charging signal and a communications protocol signal, respectively;
   generating the communications protocol signal via a universal serial bus interface device according to a universal serial bus peripheral device connected thereto;
   determining whether to provide the power to the universal serial bus peripheral device or not via a switch device coupled between the charger module and the universal serial bus interface device according to the switching signal and the power suspending signal;
   wherein the switch device further comprises a logic gate and a transistor, the logic gate has a first input end coupled to the charger module, a second input end coupled to the control unit, and an output end, and the transistor has a first end coupled to the charger module, a second end coupled to the universal serial bus interface device, and a control end coupled to the output end of the logic gate.

8. The charging management method as claimed in claim 7, wherein the power management signal is generated by a central processing unit according to a global system state of a computer, and the control unit outputs the switching signal to the switch device when the computer is operating in "Standby" state, "Sleep" state or "Soft off" state.

9. The charging management method as claimed in claim 7, wherein the switching signal indicates to stop providing the power to the universal serial bus peripheral device for a predetermined time, and then restarts providing the power to the universal serial bus peripheral device.

\* \* \* \* \*